United States Patent [19]
Betrisey et al.

[11] Patent Number: 5,959,625
[45] Date of Patent: Sep. 28, 1999

[54] METHOD AND SYSTEM FOR FACILITATING NAVIGATION AMONG SOFTWARE APPLICATIONS AND IMPROVED SCREEN VIEWING

[75] Inventors: Christian J. Betrisey, Buffalo Grove; Joseph F. Vitaterna, Northbrook, both of Ill.; Herbert Meier, Baar, Switzerland

[73] Assignee: Siemens Building Technologies, Inc., Buffalo Grove, Ill.

[21] Appl. No.: 08/905,472

[22] Filed: Aug. 4, 1997

[51] Int. Cl.$^6$ .................................. G06F 3/00; G06F 3/14
[52] U.S. Cl. ........................ 345/339; 345/346; 345/340; 345/348
[58] Field of Search .................................. 345/339, 340, 345/346, 348, 352, 357, 965, 970; 364/188; 395/680, 682

[56] References Cited

U.S. PATENT DOCUMENTS

| | | | |
|---|---|---|---|
| 5,463,727 | 10/1995 | Wiggins et al. | 345/353 |
| 5,576,946 | 11/1996 | Bender et al. | 364/146 |
| 5,631,825 | 5/1997 | Van Weele et al. | 364/188 |
| 5,642,490 | 6/1997 | Morgan et al. | 345/342 |
| 5,664,133 | 9/1997 | Malamud et al. | 345/352 |
| 5,721,850 | 2/1998 | Farry et al. | 345/346 |
| 5,774,119 | 6/1998 | Alimpich et al. | 345/340 |
| 5,821,933 | 10/1998 | Keller et al. | 345/348 |

FOREIGN PATENT DOCUMENTS 0585131  3/1994  European Pat. Off. ........ G06F 3/023

OTHER PUBLICATIONS

"Systems Application Architecture, Common User Access, Advanced Interface design Guide", IBM, pp. 18–22, 1989.
Robert Cowart, "Mastering Windows 3.1", SYBEX, pp. 10–16, 1993.
"Dropping an Item on an Icon List During a Direct Manipulation Operation", IBM Technical Disclosure Bulletin, vol. 33, No. 6A, Nov. 1, 1990, p. 456.
Landis & Gyr Powers, Inc. Brochure, "Systems Management—INSIGHT® for Personal Computers", Rev. 5, Mar. 1995.

*Primary Examiner*—Raymond J. Bayerl
*Assistant Examiner*—X. L. Bautista
*Attorney, Agent, or Firm*—Greer, Burns & Crain, Ltd

[57] ABSTRACT

A method for facilitating navigation among software applications and improved screen viewing in a Windows-based environment wherein a security based configurable primary menu is generated in a foreground of a display screen and an application is automatically spawned upon dropping of an object into a graphic element in the primary menu without resorting to additional initializations or spawning steps. Also, the security based configurable primary menu is automatically minimized and the corresponding running application windows are simultaneously removed from the viewing area in addition to the minimization of the primary menu.

16 Claims, 4 Drawing Sheets

METHOD AND SYSTEM FOR FACILITATING NAVIGATION AMONG SOFTWARE APPLICATIONS AND IMPROVED SCREEN VIEWING

BACKGROUND OF THE INVENTION

The present invention relates generally to Windows-based computer systems that run multiple software applications, and more particularly to Windows-based computer systems for use in building automation control systems that use multiple building control applications where navigation among applications is necessary.

Many Windows-based software applications are known, such as Microsoft's®, Office program, and many other Windows-based applications that are run through a Windows-based platform such as Windows NT®. Common among Windows-based software applications is the drag and drop function which allows a user to drag graphical data, such as an icon, to another icon whereafter the operating system allows (or disallows) the underlying application to accept the dragged and dropped icon.

With conventional Windows-based platforms, a main or primary menu also known as "shortcut bar" or "toolbar" can be configured to have several graphic elements such as icons, each representing a different application. In building automation systems, these applications may include a fire and security control application, a report generating application, a HVAC control application, as well as others. Main menus are often kept in the foreground to allow the user to readily access other applications. However, as part of the navigation sequence, a user typically has to click (with a mouse) the graphic element in the main menu to start the application and then open the "Open File" dialog in the application in order to select which object or document to open. In an object oriented Windows-based platform, objects such as a text document can be dragged and dropped onto the word processing application icon to automatically open the word processing application without further activation steps. However, this is only typically available when the graphic element is outside the main menu, e.g., on the desktop or the File Manager or Explorer. To reduce the number of user operating steps to navigate to an application, it would be desirable to allow a user to more easily navigate to, and start, a new application directly from the main menu.

Windows-based platforms that have main menu features can also provide screen uncluttering options such as minimizing the main menu containing multiple graphic elements into one graphic element. This can be advantageous when a large number of applications must be opened in complex systems such as building automation systems. Minimizing main menus into a single icon can allow the user additional screen space to open and interface with additional applications. However, with conventional main menu minimization features, the applications that have already been opened still appear in the viewing area. Therefore, the viewing area is still cluttered with opened (spawned) applications so that when another layer of applications accessible by yet a second main menu is used, the viewing area becomes unnecessarily cluttered. Therefore, there exists a need for a navigation system that improves screen viewing in a Windows-based environment and provides more complete screen uncluttering when a main menu is minimized.

Accordingly, it is a general object of the present invention to provide a method and system for facilitating navigation among software applications and improved screen viewing in Windows-based environments.

It is a further object of the present invention to provide a method for facilitating navigation among software applications and improved screen viewing in a Windows-based environment wherein a security based configurable primary menu is generated in a foreground of a display screen and an application is automatically spawned upon dropping of an object into a graphic element in the primary menu without resorting to additional initializations or spawning steps.

Another object is to provide a method for facilitating navigation among software applications and improving screen viewing wherein the security based configurable primary menu is automatically minimized and wherein corresponding running application windows are simultaneously removed from the viewing area in addition to the minimization of the primary menu. Note that the applications are still running, but are hidden.

Other objects and advantages will become apparent upon reading the following detailed description in connection with the attached drawings.

DETAILED DESCRIPTION

Broadly stated, the disclosed method and system for facilitating navigation among software applications and improving screen viewing in a Windows-based environment includes providing a security based configurable primary menu system in the foreground of a display screen that contains a number of icons representing software applications. When a database object is dragged and dropped onto an unspawned application in the security based configurable primary menu, the system automatically spawns the application after determining whether the application can accept that dropped object. In addition, the navigation and improved screen viewing system clears a screen viewing area by automatically minimizing the primary menu graphic elements into one graphic element while simultaneously removing corresponding running application windows from the viewing area.

Figure 1:
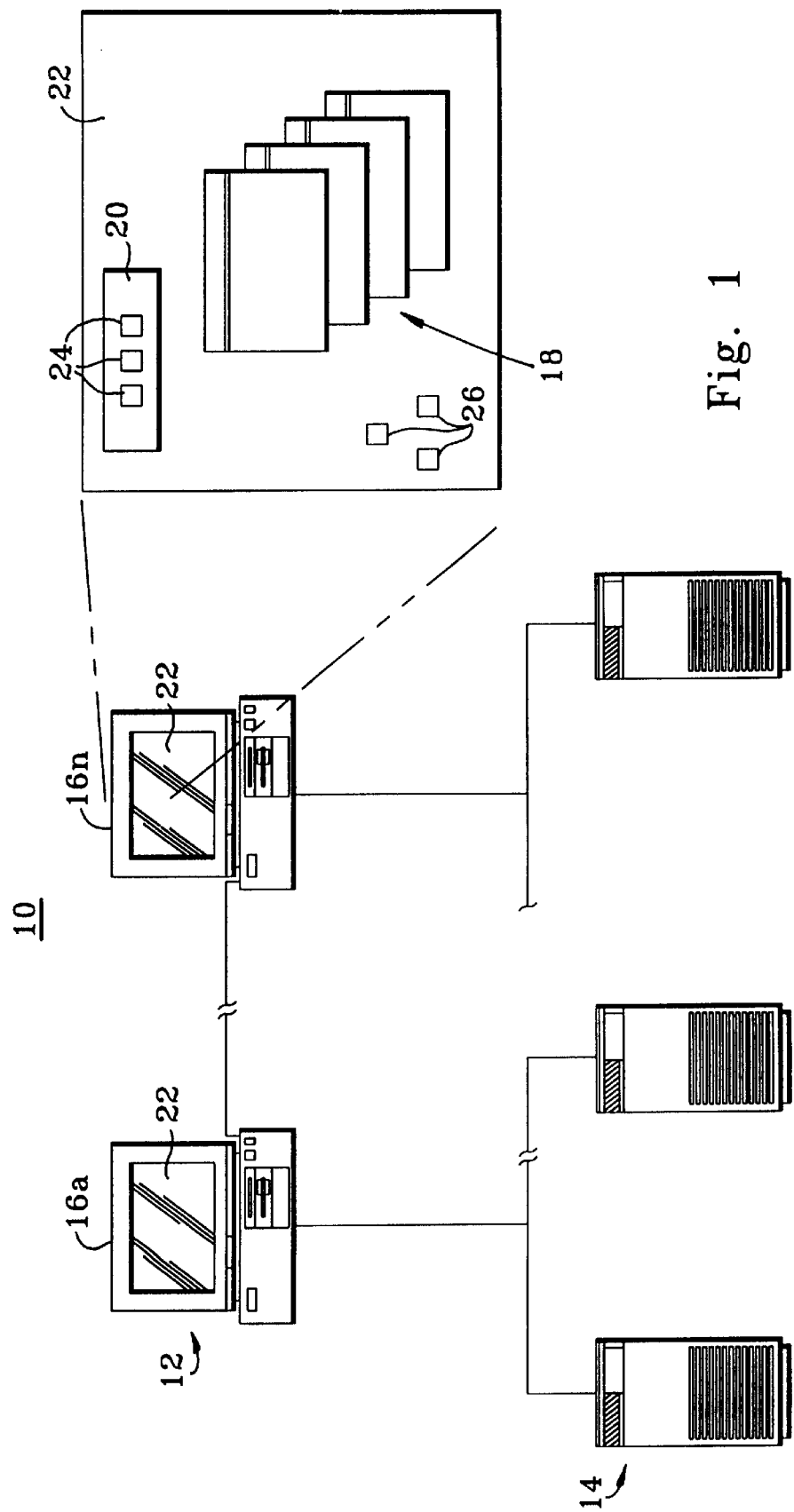
FIG. 1 is a block diagram of a networked building automation control system using a Windows-based environment which contains the navigation and improved screen viewing system in accordance with an embodiment of the invention.

FIG. 1 shows a building automation system 10 containing several layers 12 and 14 of networks wherein layer 12 is an upper layer which communicates with lower layer 14 through network links. The network layer 12 contains nodes 16a through 16n which are computers having Windows-based environments such as Window NT® environments. Each computer node 16 may be a personal computer with associated memory for storing application programs. Each computer node including node 16 can have numerous applications that may be opened at the same time, as is indicated generally at 18. A security based configurable primary menu 20 is displayed in the foreground of a display screen 22. The multiple applications 18 may be any suitable applications as required by the particular system. It should be understood that although the description herein refers to a building automation system, the invention is applicable to any Windows-based environment on any suitable computer (including nonnetworked units).

The security based configurable primary menu 20 is security based since each application represented in the primary menu may only be accessed by an appropriate user. The security based configurable primary menu 20 includes a number of graphic elements 24A through 24E that represent applications that may be activated through the primary menu 20. The graphic elements 24A–24E may be icons. Other icons 26 representing additional applications in a background may also be shown on display screen 22. The icons are graphic elements 24A–24E which represent software applications for carrying out facilities management activities in a building automation system. These applications are represented by database objects as icons to the user.

Figure 2:
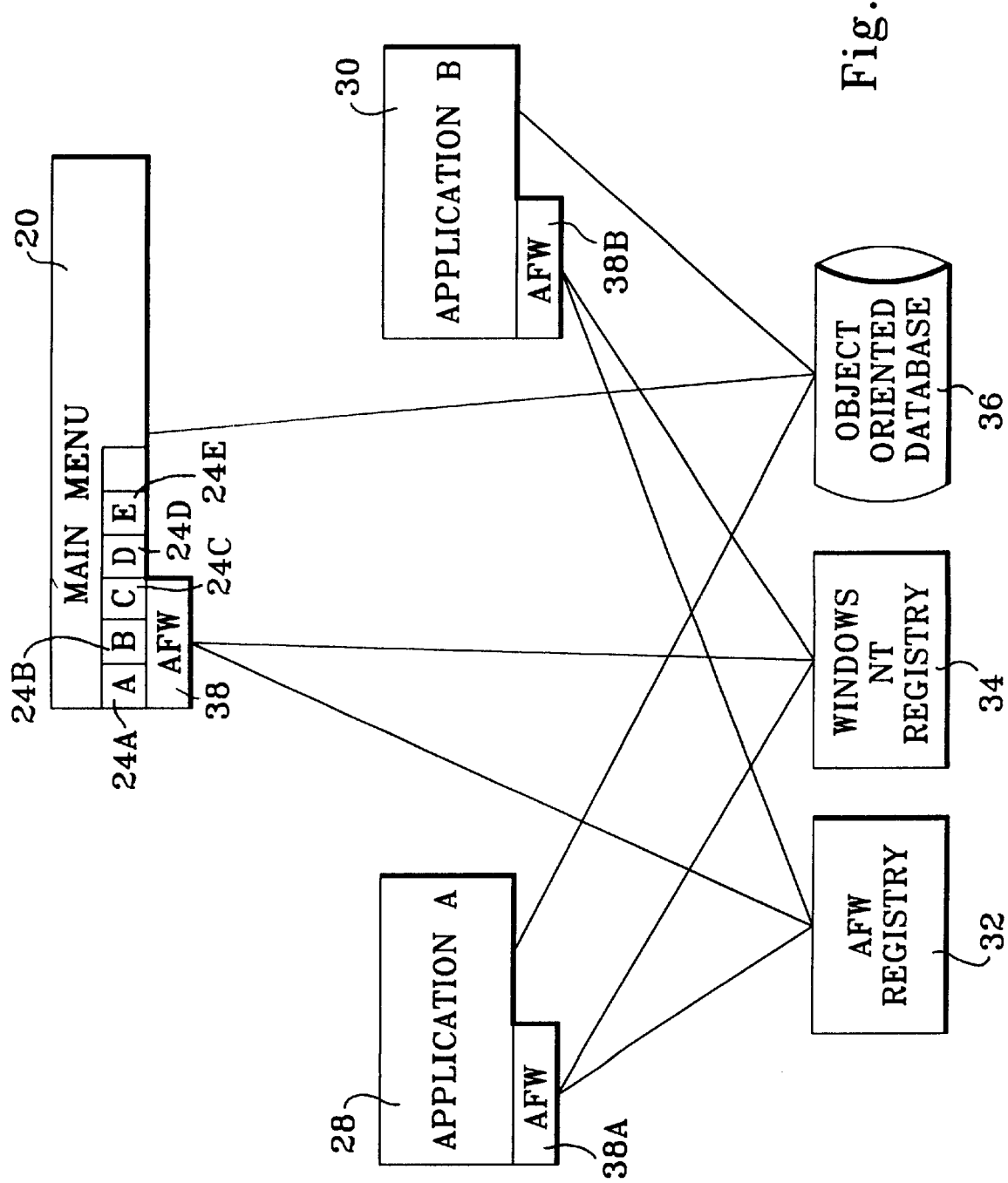
FIG. 2 is a block diagram generally illustrating an embodiment of the main menu with multiple applications and links to AFW's and registries in accordance with the invention.

FIG. 2 is a block diagram generally depicting the relationship among the security based primary menu 20, various applications, such as application A 28 and application B 30 along with a pair of memory registries, such as AFW registry 32 and Window NT® 34 and object oriented database 36. As shown, there is a main menu AFW 38 and an associated application AFW 38A and 38B. Each application has a corresponding AFW associated with it.

The Window NT® registry 34 contains a list of all available applications on the node 16. The Window NT® registry also contains a list of all object types that each application can access. The AFW registry 32 contains a list of all applications whether running or not, the state of each application (e.g., running/not running), security attribute indicating whether the application can be accessed or not by the user and software copyright protection information.

When a user wishes to navigate from one application to another, information is sent with the navigation which contains a list of objects and object types. In the preferred embodiment, the data itself is not passed in the navigation request. The object names for an application are unique and allow a destination application to retrieve the full objects from the object running database 36. The application framework AFW 38 is shared application framework which is accessed by the main menu 20 and other applications such as application A 28 and application B 30.

As shown, the application framework references application framework registry 32 and Window NT® registry 34 when navigation occurs. Once it is determined that the application can accept the dropped object, the application 28 or 30 will access the object oriented database 36 to obtain the full objects.

Figure 3:
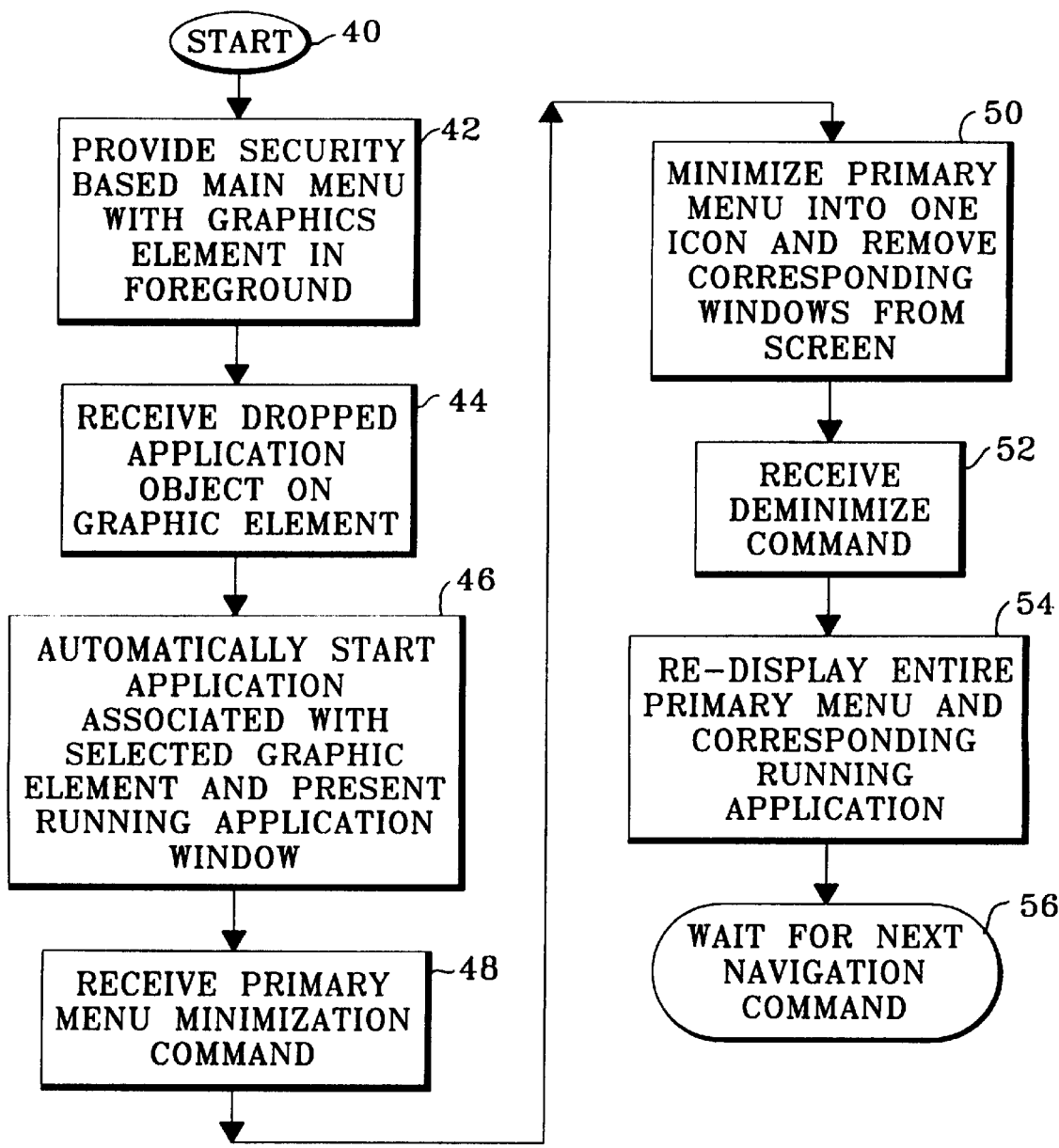
FIG. 3 is a flow diagram generally indicating the steps for implementing the navigation and improved screen viewing method as carried out by the system of FIG. 1.

A method for facilitating navigation among software applications and providing improved screen viewing is generally shown in FIG. 3. The process is started (block 40) by a user accessing node 16 by inputting a user ID which is preferably a name and password. Based on the user ID, the node determines which applications the user is allowed to access thereby providing a security based main menu 20 with graphic elements in the foreground of the screen (block 42). The node 16 provides the security based main menu 20 at the top of the screen as shown in FIG. 1 to allow for easy access by a user. When a user wishes to navigate to another application, a graphic element such as icons 24A–24E in the main menu, receive the dropped application object onto the graphic element (block 44). Upon receipt of the dropped application onto the graphic element, the node 16 for software control automatically verifies that the object that had been dropped can be accepted by that application and this is obtained from the Window NT® registry 34 and then starts the selected application and presents a running application window. In addition, the node 16 checks the security attribute of the selected application to determine whether the instant user has security clearance to access the application. This is indicated generally at block 46 in FIG. 3.

When a user also wishes to unclutter the viewing area of the screen by minimizing the main menu 20, the user may click on the main menu minimize button whereafter the node 16 minimizes the graphic elements on the main menu into a single icon graphic element (block 48). The security based primary menu is minimized into an icon while node 16 simultaneously removes corresponding application windows from the viewing screen for those applications that were running (block 50). This automatic minimization of the main menu and clearance of running application windows in the viewing area provides a new user operational area to call up other applications not selectable through the main menu.

When the user wishes to reestablish the main menu to deminimize it, the user may click on the single minimized icon which then generates a deminimize command for the node 16 (block 52). Node 16 receives the deminimize command and reestablishes the main menu 20 at the top of the viewing screen with the graphic elements 24A–24E. All previously cleared or hidden running application windows will be redisplayed by the node 16 (block 54). The node will then await the next navigation command from the user and will continue navigating the user to the various application as required (block 56).

Figure 4:
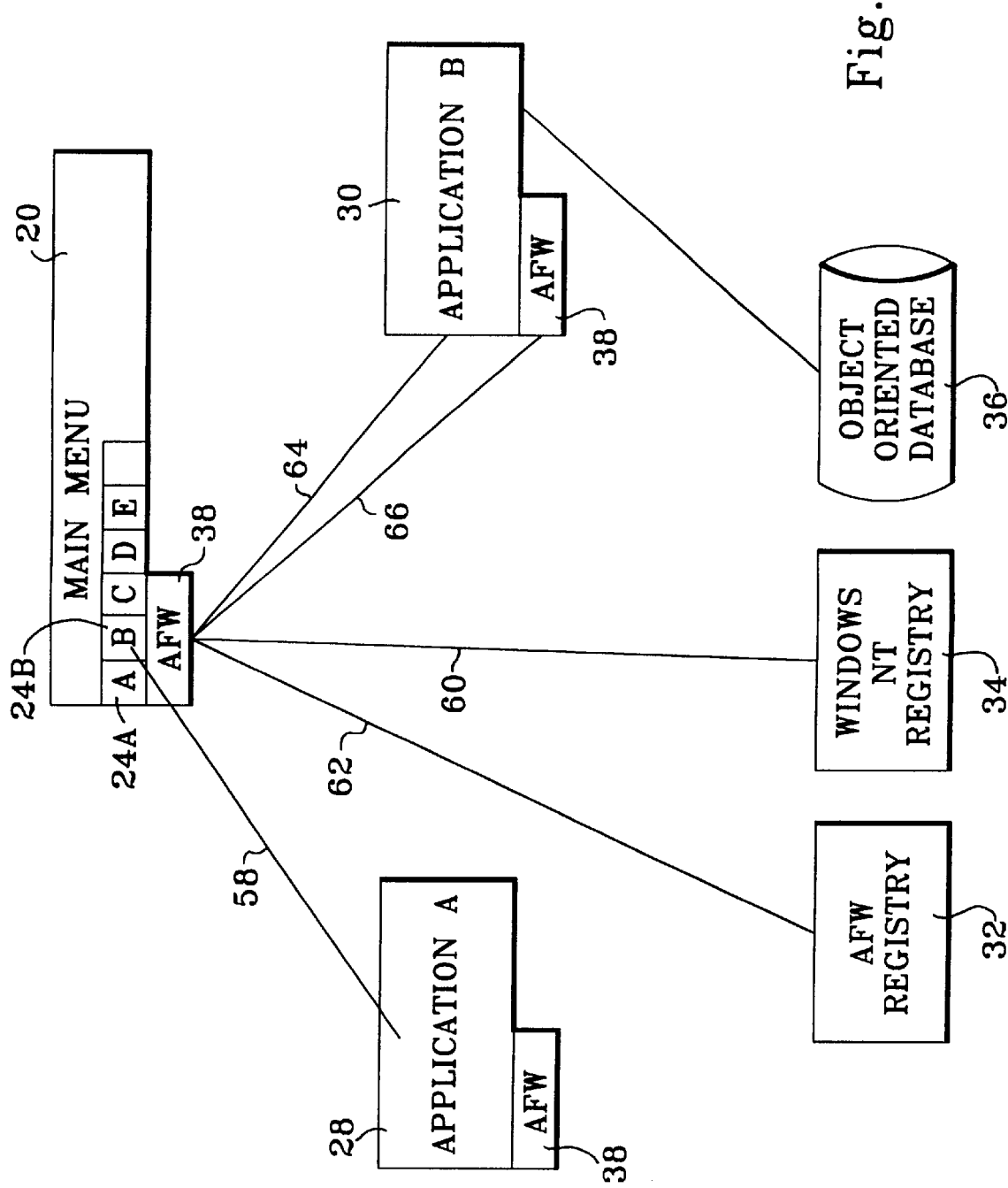
FIG. 4 is a block diagram generally indicating links among the application and registries when the application logic is dropped on to the main menu in accordance with an embodiment of the invention.

A further illustration that there are several ways for a user to navigate to an application is shown in connection with FIG. 4. A user can start an application by clicking an icon representing the application in the main menu 20. If, for example, the user uses a mouse to click on the icon A 24A, the AFW module checks whether A is already running. If not, the AFW 38 will spawn the selected application. If application A is already running, it will put the application on top and make it visible if it was previously iconized. From any application, such as application A 28, the user can click on one or more objects in the application with a mouse and drag them to the main menu 20 as shown by solid line 58. When the cursor enters graphic element 24B or icon B, the AFW 38 checks in the NT windows registry 34 to determine whether the target application B accepts this object type or not as indicated by line 60.

If the AFW 38 determines that the target application cannot accept the object type, the AFW displays a special cursor and does not allow the user to drop the object. However, if the AFW determines that the application B can accept the object type, the AFW enables the dropping of the object onto icon B 24B. When the object is dropped, the AFW 38 accesses the AFW registry 32 as shown by line 62 to determine where the application B is residing. The AFW 38 starts or spawns the application B as shown by line 64 or makes application B visible by virtue of application window if the application B is already running. The AFW 38 then sends a message containing the context to the target application B as shown by line 66. The application B then accesses the database 36 to retrieve the full object including all attributes as indicated by line 68.

Also, any application can navigate directly to any other application without using the main menu. For example, if the user drags a selected object from application A to another application such as application B, when the cursor enters the application B, the AFW 38B is activated and checks in the NT window registry 34 to determine whether the target application B 30 accepts the object type or not. If the AFW determines that application B does not accept this type of object, the AFW 38B displays a special cursor and does not allow the user to drop from the object. However, if the AFW determines that application B can accept the object from application A, the AFW enables the dropping of the object on to application B. When the object is dropped, the AFW 38 associated with application B sends a message containing the context to application B.

In summary, the security based configurable primary menu is always on top and allows for easy navigation from any application. In this way, there is no need to move the application to find the main menu or to use short cuts on the node. Also, the inventive system and method allows an object to be dropped onto the main menu and an application automatically spawned. When the main menu is minimized (or iconized), the viewing area would be cluttered, and for this reason all applications are also removed from the viewing area to provide maximum viewing area for additional applications that may be needed to be accessed and run. When the main menu is restored or activated for deminimization, all applications are restored and displayed as they were prior to minimization. The system preferably utilizes an independent AFW registry for shared data to insure that unauthorized users cannot change security attributes and software copy protection information.

A context is an array of structured names. Each name is stored into an object along with its type. The type is used in order for an application to accept or refuse to be navigated to or by another application. For example, a graphic application will typically only accept objects of a graphic type and may refuse to accept objects of the type of another application. Each application has an entry in the Windows NT 34 registry that contains a list of all types of objects accepted by the application. In order for an application to accept a drag and drop graphic or to be navigated to, all structured names types must have a matching entry in the registry.

The registry contains a list of all installed applications in the system. When an application is closed, it automatically stores its size, position and stated (full screen or normal) in memory, when the application is started again, it retrieves these values and positions itself accordingly on the screen. This is accomplished by the AFW. Each application is linked to an AFW library.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for facilitating navigation among software applications and improving screen viewing in a windows based environment comprising:

provinding a menu system with a configurable primary menu in a foreground of a display screen that contains graphic elements representing separate software applications that receive an application related object that is dragged and dropped to a selected one of the primary menu graphic elements and the menu system automatically starts an application associated with the selected one of the primary menu graphic objects and presents a running application window in response to receiving the dropped overlaid application related object; and clearing a screen viewing area by automatically minimizing the primary menu graphic elements into at least one graphic element and simultaneously removing corresponding running application windows representing said separate applications from the viewing area.

2. The method of claim 1 further including the step of unclearing the viewing area by deminimizing the one graphic element and simultaneously redisplaying the primary menu and corresponding running application windows.

3. The method of claim 1 wherein the graphic elements are icons and the applications are for carrying out facilities management activities in a building automation system.

4. The method of claim 1 wherein the application related object is represented graphically by an icon.

5. The method of claim 1 wherein the step of providing a configurable primary menu includes providing a windows based operating platform having a platform registry containing a list of available applications and a list of object types that each application can accept.

6. The method of claim 5 wherein said primary menu is also a security based primary menu so that the step of providing a configurable primary menu also includes providing an application framework registry containing a list of all applications whether running or not, a state of each application (running or not), and a user security attribute indicative of whether an application is allowed to run for the user that is accessible by a navigation program.

7. The method of claim 1 including the step of continually locating the primary menu on top of a viewing area when applications are running to facilitate ready access of the primary menu by a user.

8. The method of claim 1 wherein the step of automatically starting the applications includes using names of the objects and object type to determine the application to be started and wherein the selected application later receives required objects from a database.

9. A method for facilitating navigation among software applications and improving screen viewing in a windows based environment comprising:

providing a menu system with a configurable primary menu in a foreground of a display screen that contains graphic elements representing separate software applications that receive an application related object that is dragged and dropped to a selected one of the primary menu graphic elements and the menu system automatically starts an application associated with the selected one of the primary menu graphic objects and presents a running application window in response to receiving the dropped overlaid application related object;

clearing a screen viewing area by automatically minimizing the primary menu graphic elements into one graphic element and simultaneously removing corresponding running application windows representing said separate applications from the viewing area;

unclearing the viewing area by deminimizing the one graphic element and simultaneously re-displaying the primary menu and corresponding running application windows; and continually locating the primary menu on top of a viewing area when the graphic elements of the primary menu are not minimized and when applications are running to facilitate ready access of the primary menu by a user.

10. The method of claim 9 wherein the step of providing a configurable primary menu includes providing a windows based operating platform having a platform registry containing a list of available applications and a list of object types that each application can accept.

11. The method of claim 10 wherein said primary menu is also a security based primary menu so that the step of providing a configurable primary menu also includes providing an application framework registry containing a list of all applications, a running state of each application, and a user security attribute indicative of whether an application is allowed to run for the user that is accessible by a navigation program.

12. A system for facilitating navigation among separate software applications and improving screen viewing in a windows based environment comprising:

means for displaying various windows; and means in communication with the display screen, for providing a menu system with a configurable primary menu in a foreground of a display screen that contains graphic elements representing software applications that receive an application related object that is dragged and dropped to a selected one of the primary menu graphic elements and the menu system automatically starts an application associated with the selected one of the primary menu graphic objects and presents a running application window in response to receiving the dropped application related object; and for clearing a screen viewing area by automatically minimizing the primary menu graphic elements into one graphic element and simultaneously removing corresponding running application windows representing said separate applications from the viewing area.

13. The system of claim 12 wherein the means for providing is a node in a networked based building automation system.

14. The system of claim 13 wherein the means for providing operates using a windows based operating platform and accesses a platform registry containing a list of available applications and a list of object types that each application can accept.

15. The system of claim 14 wherein said primary menu is a security based primary menu so that the means for providing also provides an application framework registry containing a list of all applications whether running or not, a state of each application, and a user security attribute indicative of whether an application is allowed to run for a particular user.

16. The system of claim 12 wherein the means for providing continually locates the primary menu on top of a viewing area when applications are running to facilitate ready access of the primary menu by a user.

* * * * *